United States Patent [19]
Breyer et al.

[11] Patent Number: 5,982,491
[45] Date of Patent: Nov. 9, 1999

[54] METHOD AND APPARATUS MEASURING EDGES ON A WORKPIECE

[75] Inventors: Karl-Hermann Breyer, Heidenheim; Klaus-Dieter Götz, Serheim; Rolf Beck, Esslingen, all of Germany

[73] Assignee: Carl-Zeiss-Stiftung, Heidenheim, Germany

[21] Appl. No.: 08/954,633

[22] Filed: Oct. 20, 1997

[30] Foreign Application Priority Data

Oct. 21, 1996 [DE] Germany .............................. 196 43 315
Dec. 23, 1996 [DE] Germany .............................. 196 54 067

[51] Int. Cl.$^6$ ............................. G01B 11/14; G01B 11/24
[52] U.S. Cl. ........................................... 356/375; 356/376
[58] Field of Search ...................................... 356/375, 376

[56] References Cited

U.S. PATENT DOCUMENTS 5,291,270  3/1994  Koch et al. .

FOREIGN PATENT DOCUMENTS 2405102  8/1975  Germany .

*Primary Examiner*—Robert H. Kim
*Assistant Examiner*—Amanda Merlino
*Attorney, Agent, or Firm*—Walter Ottesen

[57] ABSTRACT

The invention is directed to a method and an apparatus for measuring the edges 13 of a workpiece 5 with an optical probe 4. The probe 4 measures the distance values (a) between the probe 4 and an adjustable scanning point 15. In the method, the scanning point 15 is moved along a loop path (36a, 36b, . . . , 36n) over the edge 13 of the workpiece 5 to be measured in order to obtain more exact values for measured points of the edge at a higher measuring speed. During the method, distance values (a) are measured by the probe 4 and a point P of the edge 13 is determined from the course of the measured values.

30 Claims, 6 Drawing Sheets

METHOD AND APPARATUS MEASURING EDGES ON A WORKPIECE

FIELD OF THE INVENTION

The invention relates to a method for measuring the edges of workpieces to be measured utilizing an optical probe. The optical probe measures the distance value between the probe and the workpiece surface at an adjustable scanning point. The invention also relates to an apparatus for measuring the edges.

BACKGROUND OF THE INVENTION

One method is, for example, disclosed in U.S. Pat. No. 5,291,270. This method is especially provided to determine edges and bores of workpieces to be measured such as parts of a vehicle chassis. For this purpose, an optical triangulation probe is suggested in this patent which measures the spacing of the probe to the workpiece surface and moves over the edge to be measured for measuring a point thereof. If a sudden jump results in the measured distance values, then this indicates that the optical probe passed over an edge at this point in time so that the position of a point of the edge can be determined from the corresponding distance values and the machine positions.

The optical probe is suspended from a mechanism of a coordinate measuring apparatus in order to be able to suitably move the optical probe over the surface of the workpiece. With the mechanism, the optical probe can be moved in three mutually perpendicular directions. Additionally, the optical probe is connected to the mechanism via a rotation-pivot unit so that the optical probe can be additionally rotated about two mutually perpendicular axes. In this way, the scanning beam of the probe can always be suitably adjusted to the surface of the workpiece to be measured.

What is distinctive about this method is that the accuracy of the determined point of the edge is dependent upon how close the sequentially recorded scanning points lie next to each other. The optical probe must record measuring points lying very close to each other in order to achieve a high accuracy. The central computer of the coordinate measuring apparatus assumes the entire evaluation of the measured values recorded by the probe. For this reason, only a relatively low measuring speed is possible for high measuring accuracy. Furthermore, nonuniformities in the edge can greatly alter the measuring result. If, for example, the path of the scanning point is guided over a location at which a nonuniformity in the form of a ridge is located, then this can greatly alter the result of the measured point of the edge.

From the state of the art, so-called linear probes are known which are utilized in a manner similar to the triangulation probe known from U.S. Pat. No. 5,291,270. The difference in this linear probe compared to the triangulation probe is that the scanning point in the linear probe is continuously moved back and forth along a straight line. The detection of the edge then takes place in that the scanning point of the linear probe is guided perpendicularly over the edge in its linear direction. Similarly, the edge is detected in that an abrupt change is detected for the first time in the scanned distance values.

The same characteristics apply to the disclosed linear probe as applied to the triangulation probe disclosed in U.S. Pat. No. 5,291,270.

Furthermore, a probe is known from German patent publication 2,405,102 with which edges can likewise be measured. The probe is here so configured that a light beam is guided on a circular path over the edge of the workpiece to be measured. A photodetector is mounted rearward on the opposite lying end of the workpiece. The intercept point of the circular path of the light point with the edge, and therefore the position of the edge, can be determined from the measured brightness and darkness times of the photodetector.

The characteristics of the method described in German patent publication 2,405,102 apply as already explained in connection with U.S. Pat. No. 5,291,270.

SUMMARY OF THE INVENTION

It is an object of the invention to provide a method and a coordinate measuring apparatus for measuring edges on a workpiece with which values of greater precision can be determined for measured points of the edges at a higher measuring speed.

The method of the invention is for measuring the edge of a workpiece utilizing an optical probe of a coordinate measuring apparatus to measure distances (a) between the optical probe and the surface of the workpiece at an adjustable scanning point thereon. The method includes the steps of: moving the scanning point along a path and over the edge in such a manner that the scanning point intersects the edge at a plurality of mutually adjacent locations; measuring the distances (a) with the probe during the movement of the scanning point along the path and recording the measured distance values (a); and, determining the intersect points between the path and the edge from the distance values (a) and determining a point (P) of the edge therefrom via interpolation.

The coordinate measuring apparatus of the invention is for measuring an edge of a workpiece having a surface. The coordinate measuring apparatus includes: an optical probe for measuring distance values (a) between the probe and the surface at an adjustable scanning point; a control for moving the scanning point along a path and over the edge in such a manner that the edge is intersected in a plurality of mutually adjacent locations; a processing unit connected to the optical probe for recording the distance values (a) measured during the movement thereof; and, the processing unit being adapted to determine a plurality of the intersect points between the path and the edge from the distance values (a) and to then determine a point (P) of the edge therefrom via interpolation.

The basic idea of the invention is that the scanning point is moved along a path in such a manner over the edge so that the edge is intersected in a plurality of mutually adjacent points. The intersect points between the path and the edge are determined from the plurality of distance values and a point of the edge is determined therefrom via interpolation. It is understood that a plurality of distance values here constitutes at least three distance values.

It is here noted that the term "path, which intersects the edge in a plurality of mutually adjacent points" is identical in meaning to the term "loop path" used in the following and the terms can be freely substituted one for the other.

The special advantage of this method is seen in that a plurality of distance values are recorded for the movement of the scanning point in a loop path. These distance values measure the edge next to the actual point to be measured so that nonuniformities in the point of the edge actually measured can be well compensated.

The loop path preferably exhibits a curved form which defines closed patterns repeating periodically. One possibility to generate this curved path comprises utilizing a ring probe described in German patent application 196 34 785.8. The scanning point of this ring probe is moved circularly by the probe itself. The contour of a complete circularly-shaped trace of the scanning point is referred to in the following as a scanning circle. The scanning can take place in such a manner that the probe is mounted at one location and the scanning point makes a complete rotation on its scanning circle and stores the measured distance values. After a complete rotation, the probe is then moved by a constant offset toward the edge in order to again make a rotation, et cetera. The path exhibits a plurality of sequential circles offset perpendicularly to the edge. The ring probe can also be moved toward the edge at a constant speed so that a cycloid results because of the superposition of the circularly-shaped movement of the scanning point in the probe and, on the other hand, because of the translatory movement of the probe.

It is understood that the loop path need not be so configured as it has just been described. For example, a path would be conceivable wherein the scanning point is moved over the edge in other geometric figures such as a triangle or rectangle. Various probes can be considered for generating the loop path. For example, probes are also possible wherein the scanning beam, which is needed for the scanning, is moved via a mirror in the corresponding desired geometric path over the surface or a simple triangulation probe as described in U.S. Pat. No. 5,291,270. The loop path is then generated via a corresponding control of the mechanism of the coordinate measuring apparatus.

Various possibilities are present for determining the point of the edge to be measured via interpolation from stored distances. Accordingly, one possibility is to determine different positions for the edge from the stored distance values and to determine one point of the edge from averaging the many edge positions. The interpolation takes place with the above-mentioned averaging. To determine the edge positions, one can proceed in such a manner that, from each change of the distance values associated with a jump, a conclusion can be drawn as to a crossover of the edge. In this way, a time signal can be derived which fixes at which time point the corresponding machine positions should be assumed, such as the position of the probe in the three mutually perpendicular measuring directions (X, Y, Z), angle of the rotation-pivot unit ($\alpha$, $\beta$), et cetera. From the machine positions, the corresponding edge positions can be determined over which an average is computed. This can take place either in real time or subsequently. The corresponding machine positions must then be stored over a longer time interval in a suitable memory.

It is a further possibility for determining the point of the edge via interpolation wherein the measuring speed is greatly increased compared to the previously described method. This is described below and a single time signal is derived from the trace of the distance values via interpolation. This time signal fixes a time point at which the probe assumes a fixedly defined position relative to the edge. The time signal also fixes at which time point machine positions for determining the point of the edge are to be assumed. For a ring probe, for example, the fixedly defined position can be such that the center point of the scanning circle is located precisely above the edge to be measured. The measuring time is shortened because the machine positions must only be determined once per measurement of a point of the edge. The point of the edge can then be determined easily from the corresponding machine positions and the known position of the probe relative to the edge.

The measuring speed of the method described above can be further increased in that the time signal is already determined in the probe. The special advantage results in that the interface location between the probe and a central computer of the coordinate measuring apparatus as well as the central computer itself are no longer burdened with the plurality of measured distance values; instead, only the time signal must be transmitted in addition to a few other signals.

In an especially advantageous embodiment having especially high measuring speeds, the coordinate measuring apparatus is driven at a fixed clock frequency. The time signal can then include a so-called clock-distance signal and a trigger signal. The clock-distance signal indicates how many pulses ago the probe had assumed the fixedly-defined position with respect to the edge. The trigger signal fixes the time point by which the position lies back in time (by the number of pulses in accordance with the pulse-distance signal). The above-mentioned machine positions can be determined easily in the central computer utilizing such a time signal so that time-consuming computer operations are unnecessary.

The above-mentioned time signal can be determined in very different ways. In one especially advantageous embodiment, edge crossovers are detected from abrupt changes of the distance values. A plurality of time-dependent angles are determined from the edge crossovers. These angles indicate, in dependence upon time, which angle is defined between a first straight line (between the edge crossovers and a fixed reference point) and a second straight line. In the ring probe, this can, for example, be the angle which results between the detected edge crossover of a rotation and the center point of the scanning circle. Of course, this principle can be applied to all other paths. For example, in a path which includes triangles, this angle can be the angle between the detected edge positions of a rotation and the centroid of the triangle.

From the time-dependent angles, the time signal is derived subsequently to determine the point of the edge via interpolation in that that time point is determined at which the time-dependent angle assumes a fixedly-defined value. In the above example, with the ring probe, the angle is 180° when the center point of the scanning circle is located above the edge.

The time signal can then be determined with very good precision when it is determined from the path of a function approximating the angles. The interpolation can then be carried out via the approximation.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
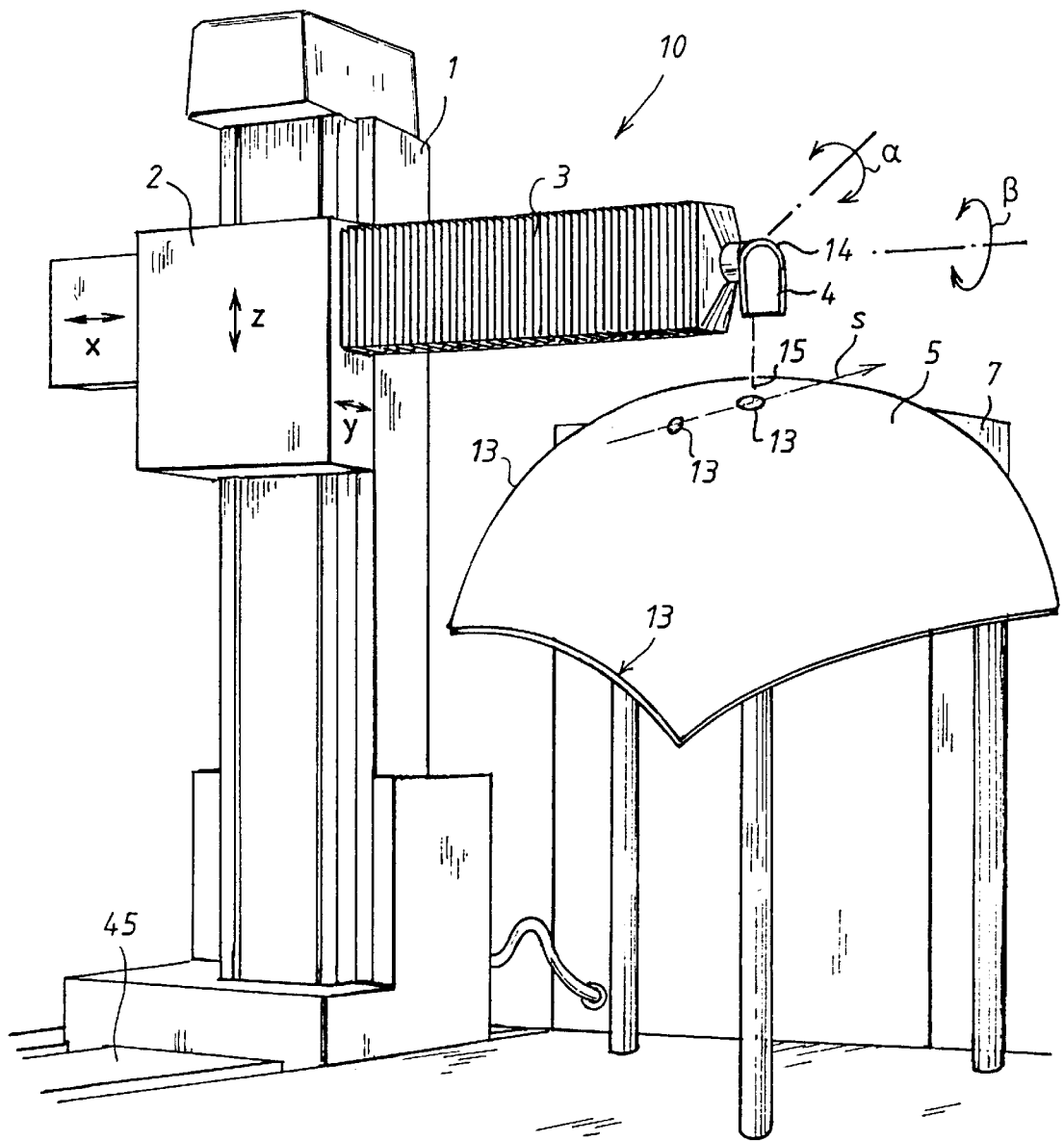
FIG. 1 is a schematic of the coordinate measuring apparatus of the invention with which the method of the invention is carried out.

FIG. 1 shows a coordinate measuring apparatus 10 according to the invention for measuring edges 13 of a workpiece 5. The coordinate measuring apparatus includes an optical probe 4 which determines the spacing (a) between the probe 4 and the surface of the workpiece 5 at different scanning points 15. The probe 4 is connected via a rotation-pivot unit 14 to a measuring arm 3 for shifting the scanning point 15. The rotation-pivot unit 14 is adequately known from the state of the art. The optical probe 4 can be rotated about the longitudinal axis of the measuring arm 3 as shown by arrow β and can, additionally, be rotated about a transverse axis, which is perpendicular to the longitudinal axis of the measuring arm 3, in accordance with arrow α. The measuring arm 3 is connected to a stand 1 via a sled 2 in such a manner that the measuring arm 3 can be moved with respect to the stand 1 in the X-direction X as well as in the Z-direction Z. The stand 1, in turn, can be moved along a guide 45 in the Y-direction (Y). Measurement value detectors 51 are provided for all three measuring directions (X, Y, Z) in order to measure the workpiece 5 in the coordinate measuring apparatus 10. With the measurement-value detectors 51, the machine position (X, Y, Z) of the probe 4 can be determined in all three measurement directions (X, Y, Z). For this purpose, glass scales are provided and are not shown as they are adequately known in the state of the art. These glass scales are scanned by appropriate sensors. In the same manner, the rotation-pivot unit 14 includes measurement value detectors 51 which scan a glass rod in order to record the machine positions (α, β) of the probe 4 with respect to the angle β as well as the angle α. The corresponding machine positions (X, Y, Z, α, β) are transmitted via a corresponding interface for further processing to the control cabinet 7 wherein a central computer of the coordinate measuring apparatus 10 is located.

Figure 2:
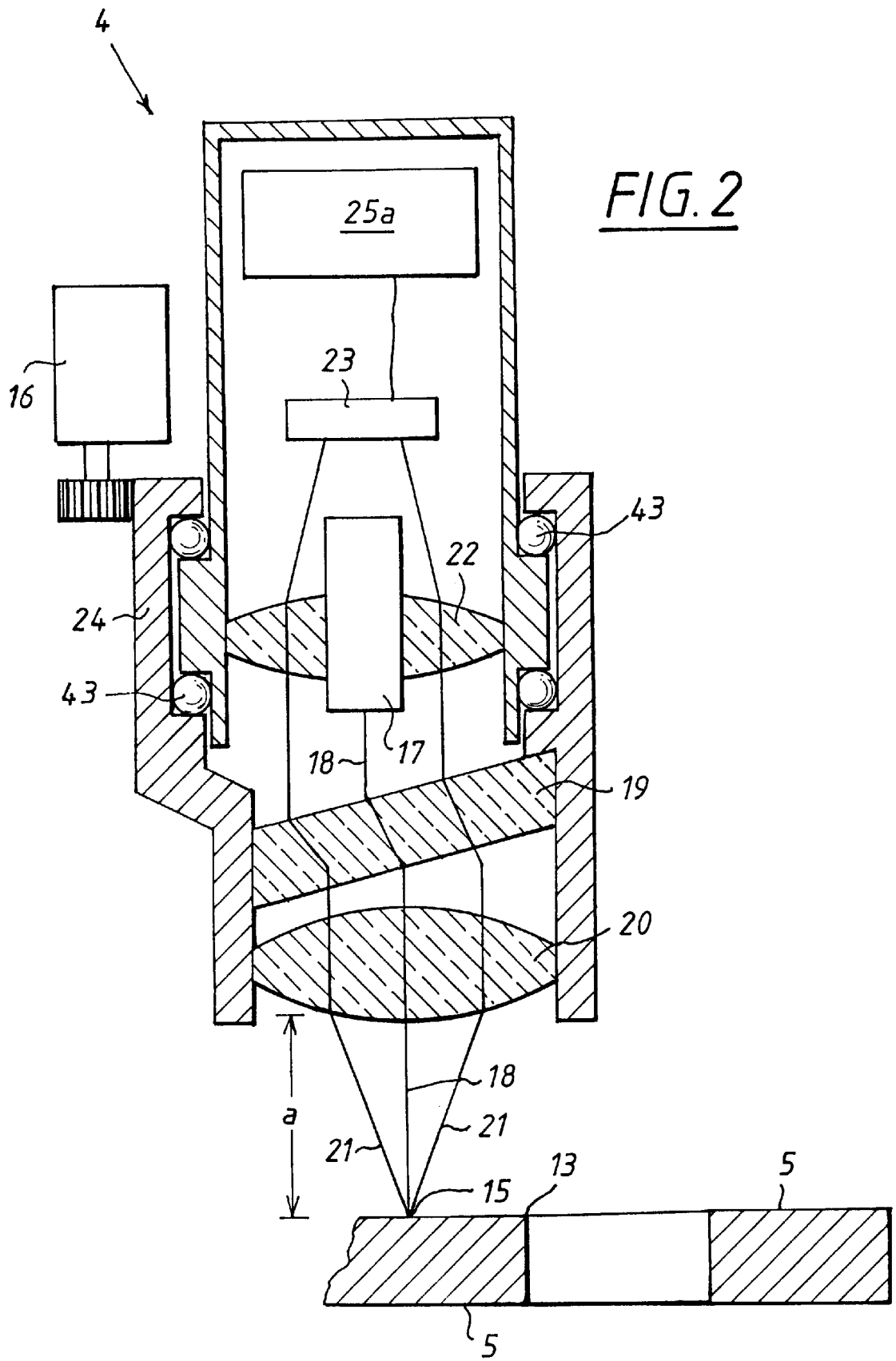
FIG. 2 is an enlarged section view of the probe of the apparatus of FIG. 1.

The optical probe 4, in turn, is in the form of a so-called ring probe so that the scanning point 15 can be moved by the probe 4 circularly on a probe circle 36. Such a probe 4 is shown in FIG. 2.

The probe 4 includes a diode laser 17 which emits a light beam 18. The beam 18 of the diode laser 17 is offset by a glass deflection plate 19 and is imaged on the workpiece 5 to be measured via a front lens 20. The deflecting plate 19 is positioned at an angle to the beam 18. The rays 21 reflected from the workpiece 5 again pass through the front lens 20 and are again offset by the deflecting plate 19 and imaged via a receiving lens 22 on a receiver 23. The diameter of the imaged circle is measured by the receiver 23 to determine the distance (a) between the surface of the workpiece 5 and the probe 4. The diameter of the imaged circle varies in dependence upon the magnitude of the distance (a) between the surface of the workpiece 5 and the probe 4. The receiver 23 is preferably a so-called photo-lateral diode (also known as a psd sensor) in order to measure the diameter of the circle. The photo-lateral diode changes its voltage in dependence upon the point of incidence of the imaged circle. The receiver 23 can, however, be configured as a segmented CCD-array which outputs different signals in dependence upon the differently illuminated respective segments. If the diameter of the imaged circle is relatively large, and therefore the distance (a) from the surface of the workpiece is large, then a high voltage can be tapped from the corresponding receiver 23. If the diameter of the imaged circle is small, and therefore the distance (a) to the surface to the workpiece 5 is small, then a low voltage can be tapped.

In the probe 4, the motor 16 is additionally provided in order to permit the scanning point 15 to rotate in a circle on the scanning circle 36. The motor 16 permits the housing 24 with the deflecting plate 19 and front lens 20 mounted therein to rotate so that the rays (18, 21) can be so deflected by the rotation of the deflecting plate 19 that they move on a circularly-shaped path (the scanning circle 36). For this purpose, the housing 24 is rotatably journalled via a ball bearing 43 on the remainder of the probe 4. The actual diameter of the scanning circle 36 is usually 1 mm. A part 25a of an evaluation device is connected to the receiver 23 and functions to determine the point P of the edge.

Figure 3:
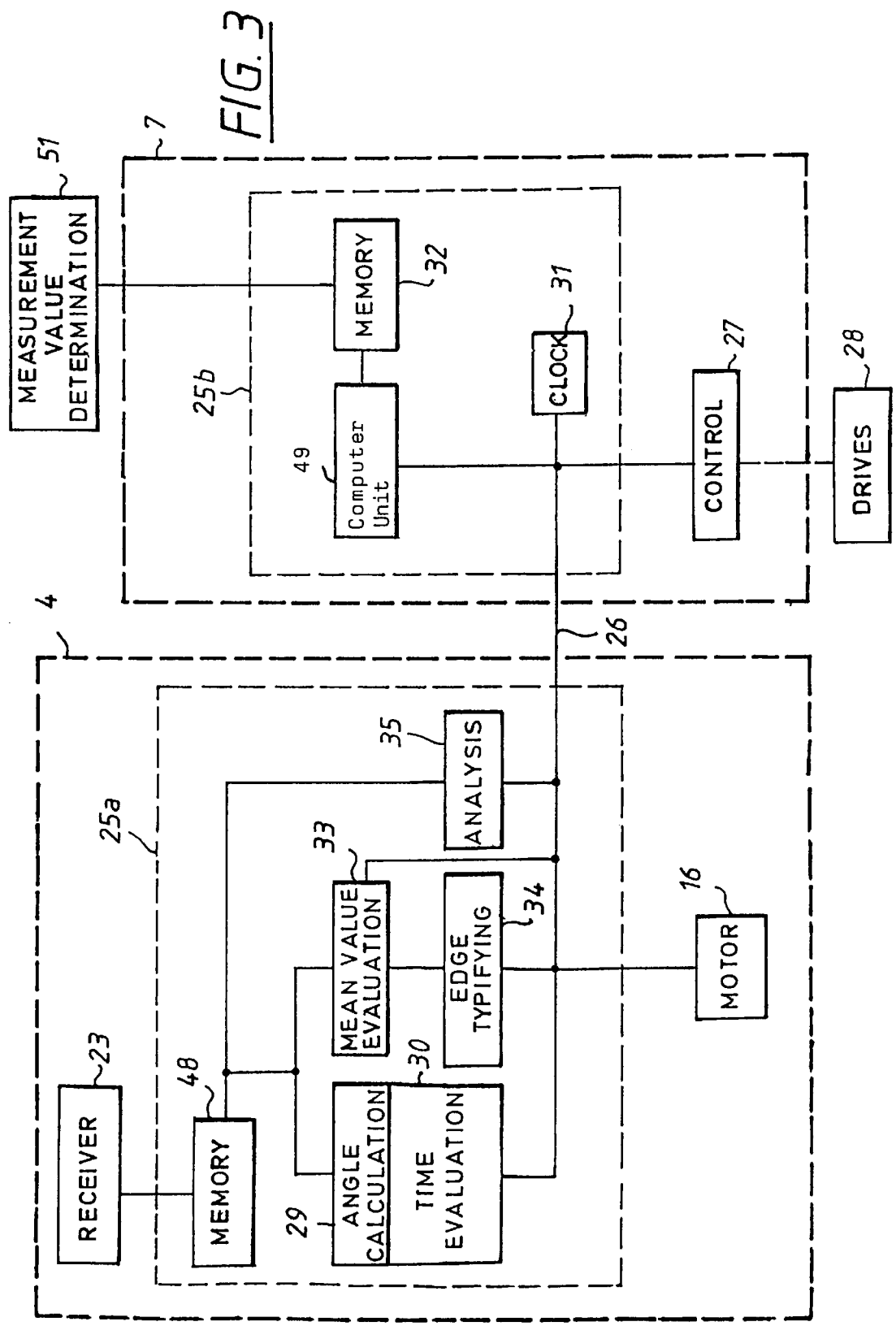
FIG. 3 is a block circuit diagram of important electronic components of the coordinate measuring apparatus of FIG. 1.

FIG. 3 shows a block circuit diagram which includes the necessary electronic components for measuring the point P of the edge 13. Reference will now be made to FIG. 3 in the following description of these electronic components of the coordinate measuring apparatus 10.

An essential portion of the electronic components is defined by the processing unit (25a, 25b) which is here configured in two parts. The processing unit (25a, 25b) receives the measured distance values (a) from the probe 4 and determines the point P of the edge 13. A part 25a of the processing unit is located in the probe 4 and the second part 25b is located in the control cabinet 7 of the coordinate measuring apparatus 10. The two parts of the processing unit (25a, 25b) are connected with each other via an interface 26. Partitioning the processing unit (25a, 25b) into two parts affords the special advantage that computations, which are necessary for determining the point P of the edge 13, are already carried out in the probe 4 so that the second part 25b of the processing unit is substantially relieved of such tasks. The part 25b is conventionally in the form of a central computer mounted in the control cabinet 7.

A control 27 is additionally provided in the control cabinet 7. The control 27 is connected to the drives 28 of the coordinate measuring apparatus 10 for changing the machine positions (X, Y, Z, α, β). The control 27 is also connected to the computer unit 29 in the processing unit part 25b as well as to the probe 4 via the interface 26. The control 27 is responsible for the entire coordination of the movement of the scanning point 15 and causes the scanning point 15 to be moved in a loop path over the edge 13 of the workpiece 5. The path is pregiven by the control 27. For this purpose, the control 27 outputs corresponding signals to the drives 28 via which the probe 4 is moved perpendicularly toward the edge 13 to be measured. The control 27 also outputs a corresponding signal to the motor 16 of the probe 4 via which the above-described rotation of the scanning point 15 on the scanning circle 36 is fixed.

Figure 4:
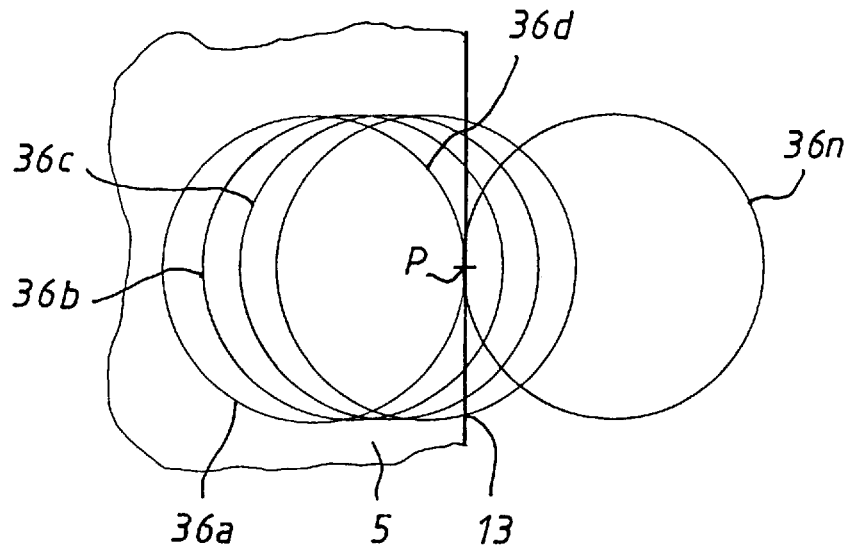
FIG. 4 is a path movement of the scanning point of the probe of the apparatus shown in FIGS. 1 and 2.

The control of the scanning point 15 is preferably so configured that the scanning point 15 rotates once on a scanning circle 36 before the probe 4 is moved farther toward the edge 13 so that the loop path arising hereby then includes a plurality of circles (36a, 36b, 36c . . . 36n) as shown in FIG. 4. The control 27 can, however, also control the drives 28 so that the probe 4 is moved continuously by the drives 28 toward the edge 13 of the workpiece 5 to be measured so that a cycloid is formed by the superposition of the circular movement and the straight-line movement.

To determine the point P of the edge in the processing unit (25a, 25b), the distance values (a), which are measured by the receiver 23 of the probe 4, are stored in a memory 48 provided in part 25a of the processing unit. This storage in memory 48 takes place during the movement of the scanning point 15 over the edge 13. The storage takes place in such a manner that the distance values are stored in a fixed relationship to the rotational angle of the scanning point 15, which is instantaneously adjusted by the motor 16 with respect to a reference position, and in a fixed relationship to the actual time point.

A time evaluation unit 30 is provided directly after the memory 48. The time evaluation unit 30 derives a time signal ($t_{180}$) subsequently from the stored distance values (a), to which the probe 4 assumes a fixedly defined position relative to the edge 13. As a fixedly defined position, that time point ($t_{180}$) is arbitrarily selected at which the center point (m) of the scanning circle 36 is located over the edge 13 to be measured. For this purpose and in the time evaluation unit 30, an angle calculation unit 29 is provided which determines a plurality of time-dependent angles ($\tau$) from the measured distance values (a). This determination is made for each rotation of the scanning point 15 on its scanning circle (36a, 36b ... 36n). This angle is here identified as edge angle ($\tau$) and is for each rotation of the scanning point 15 on its scanning circle (36a, 36b ... 36n).

Figure 5A:
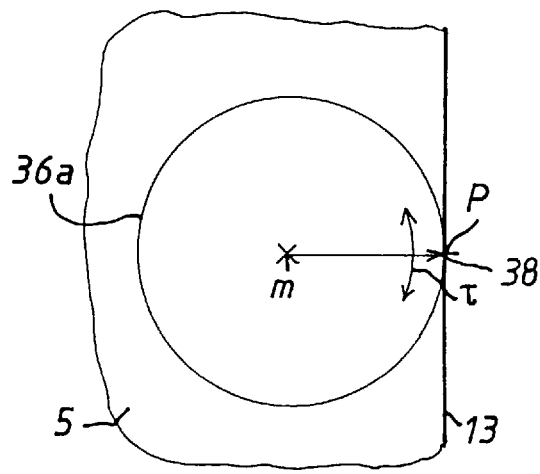
FIGS. 5a to 5c show the determined angles with a probe of the apparatus of FIGS. 1 and 2 with the travel over an edge.
Figure 5B:
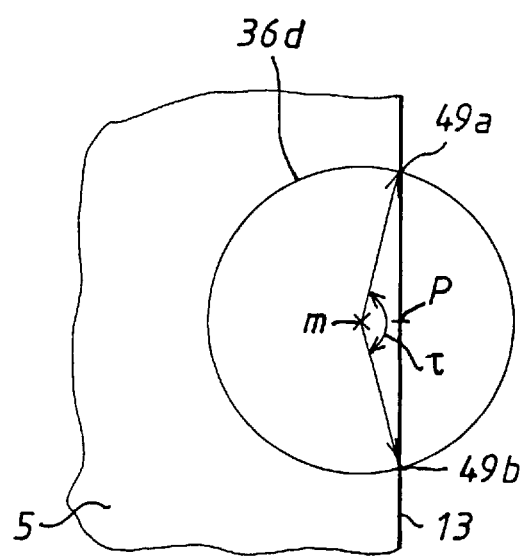
Figure 5C:
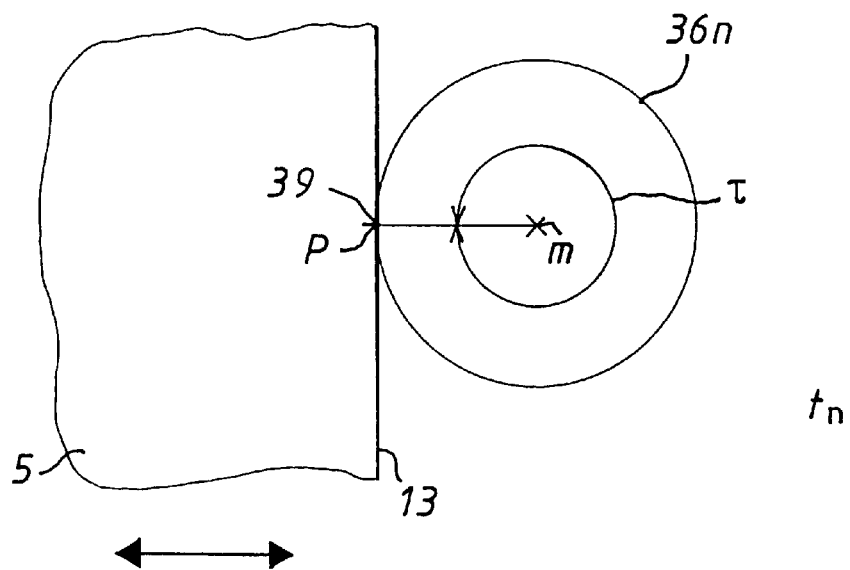

To provide a better understanding, reference is first made to FIGS. 5a to 5c. In FIGS. 5a, 5b and 5c, a time-dependent sequence of several rotations (shown in FIG. 4) of the probe circle (36a, 36d, 36n) is shown. The direction of movement was so selected for clarity that the surface of the workpiece 5 to be measured is aligned parallelly to the YZ-plane and that the edge 13 is so selected that the probe 4 is moved in the X direction for scanning the edge 13. While the scanning circle 36a of FIG. 5a is still completely on the surface of the workpiece 5 to be measured at time point $t_a$, the scanning circle 36c is at time point $t_d$ already partially on the other side of the edge 13 of the workpiece 5. The scanning circle $36_n$ is already behind the edge 13 at time point $t_n$.

In the following, the edge angle ($\tau$) is that angle which results from the connection of the edge crossover (38, 39, 49a, 49b) to the center point (m) of the scanning circle of the particular scanning circle (36a, 36d, 36n) at the particular time point ($t_a$, $t_d$, $t_n$). For FIG. 5a, the edge angle ($\tau$) is 0°. In FIG. 5b, the edge angle ($\tau$) is approximately 170° and in FIG. 5c, the edge angle is 360°.

The determination of the edge angle ($\tau$) can be easily made in the angle calculation unit 29 in that, for each rotation of a particular scanning circle (36a, 36b, 36c ... 36n), those distance values are looked for from the distance values (a) stored in the memory 48 for which the distance value changes in an abrupt manner. For these values, it is assumed that the edge crossovers (38, 39, 49a, 49b) are located there. As already explained above, the distance values (a) are stored in a fixed relationship to both the rotational angle of the instantaneous scanning point 15 (adjusted by the motor 16) with reference to a reference location as well as in a fixed relationship to the actual time point ($t_a$, $t_c$, $t_n$). For the corresponding rotational angles, the edge angle ($\tau$) which lies between the determined crossovers (38, 39, 49a, 49b), is computed in dependence upon the respective time points ($t_a$, $t_c$, $t_n$) in the angle computation unit 29.

Figure 6:
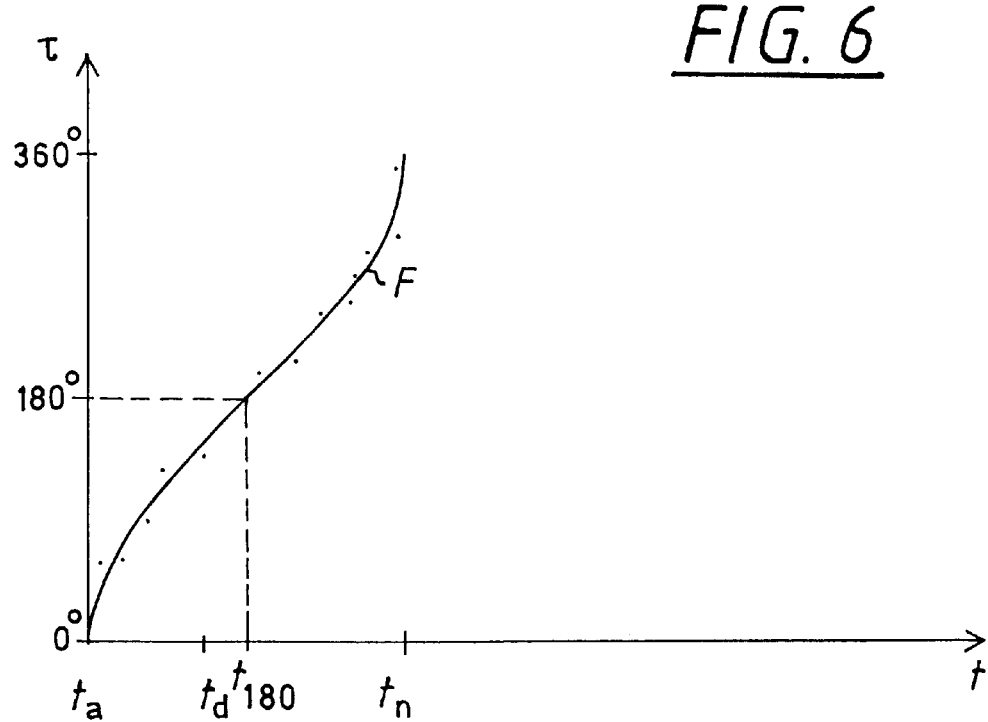
FIG. 6 shows the evaluation of the signals of FIGS. 5a to 5c.

For the time signal $t_{180}$, the center point (m) of the probe circle (36a, 36b, 36c ... 36n) is located precisely over the edge 13. To determine this time signal $t_{180}$, that time point $t_{180}$ must be determined from the time-dependent edge angles ($\tau$) to which the edge angle ($\tau$) is precisely 180°. For this purpose, and in the time evaluation unit 30, a function F is approximated to the time-dependent edge angle ($\tau$) in a first step as shown in FIG. 6. Conceivable for this purpose are the most different approximations such as: a linear or parabolic approximation, an approximation via a polynomial of the n-th order, a trigonometric approximation, et cetera. Thereafter, and from the trace of the function F approximated to angle ($\tau$), the time signal $t_{180}$ is determined in that that time point $t_{180}$ of the function F is determined at which the value thereof is precisely 180°.

The time signal $t_{180}$, which is determined in probe 4, is transmitted via the interface 26 to the computer unit 49 in the second part 25b of the processing unit. The computer unit 49, in turn, reads the corresponding machine positions (X, Y, Z, $\alpha$, $\beta$) from a memory 32 on the basis of the time signal $t_{180}$ and determines therefrom the point P of the edge 13 while taking into account the position of the probe 4 relative to the edge 13. The memory 32 must be so configured for this purpose that it stores the machine positions (X, Y, Z, $\alpha$, $\beta$) in a fixed time-dependent relationship. The machine positions (X, Y, Z, $\alpha$, $\beta$) are supplied by the measurement-value detectors 51. For this purpose, the memory 32 can be configured as a ring buffer which stores the machine positions (X, Y, Z, $\alpha$, $\beta$) at a clock pulse T determined by a clock 31.

The coordinate measuring apparatus and the probe 4 are driven by a clock unit 31 at a fixed clock frequency T in order to be able to determine the result of the probe position as rapidly as possible. The time signal $t_{180}$, which is generated by the time evaluation unit 30, includes a clock-distance signal $t_{ab}$ (which indicates how many clock pulses ago the probe 4 had assumed the above-mentioned position with respect to the edge 13) and a trigger signal $t_{tr}$ (which fixes the time point by which the above-mentioned position of the probe 4 with respect to the edge 13 lies back in time by the number of clock pulses in accordance with the clock-distance signal $t_{ab}$). These two signals are transmitted via the interface 26 to the part 25b of the processing unit.

Figure 7:
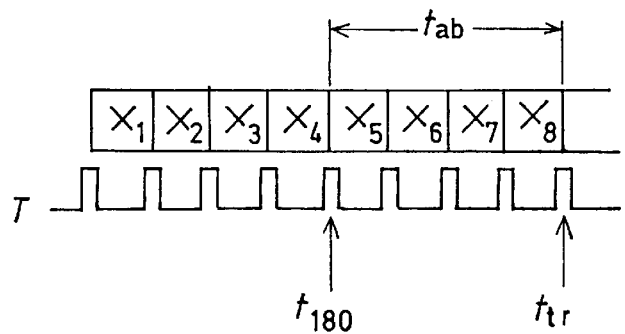
FIG. 7 shows the time signal.

In part 25b of the processing unit, and as already mentioned above, the machine positions (X, Y, Z, $\alpha$, $\beta$) are continuously stored in the memory 32 at the system clock frequency as shown, for example, in FIG. 7 for the X values (X1, X2, X3 ... X8). The computer unit 49 receives the clock-distance signal $t_{ab}$ via the interface line 26 as well as the subsequent trigger signal $t_{tr}$ to determine the machine position X5 which is fixed by the time signal $t_{180}$. After the trigger signal $t_{tr}$ has arrived at the computer unit 49, the computer unit 49, to determine the machine position in the X-direction, reads out that particular machine position X5 from the memory 32 which, counted from the time point of the arrival of the trigger signal $t_{tr}$, lies back in time by the number of clock pulses in accordance with the clock-distance signal $t_{ab}$. This machine position X5 then represents the machine position in the X-direction at that time point at which the center point (m) of the scanning circle is located above the edge 13. The remaining machine positions (Y, Z, $\alpha$, $\beta$) are read out in an analog manner.

It is understood that the clock signal $t_{180}$ can vary. For example, the trigger signal $t_{tr}$ can be first transmitted and then the clock-distance signal $t_{ab}$. Furthermore, the clock-distance signal $t_{ab}$ can either be constant or can also vary. It is understood that the clock-distance signal can also be transmitted as a digital time value. Then, to determine the machine position in the processing unit part 25b, a significantly greater computation complexity would be needed.

Up to now, only the precise position of the point P of the edge 13 in the plane of the surface of the workpiece 5 can be determined from the machine positions (X, Y, Z, α, β) read out as described above. If, in addition, also the precise spatial position of the point P of the edge is to be determined, then the processing unit part 25b additionally needs the actual distance value from the surface of the workpiece 5 as a machine position. For this purpose, and in principle, all distance values (a) of the probe 4 can be transmitted by the probe 4 to the computer unit 49 and be here further processed to determine the point P of the edge 13 (in a manner similar to the other machine positions (X, Y, Z, α, β)).

It is, however, especially advantageous when a distance value is determined only once and this value is transmitted from the processing unit part 25a via an interface 26 to the processing unit part 25b and is there stored until the point P of the edge 13 is determined. A one-time determination of the distance value is only possible because the scanning beam 18 (as will be described in greater detail below) is aligned in advance of the measurement perpendicularly to the surface of the workpiece to be measured so that almost constant distance values (a) can be measured for an approximately planar surface of the workpiece 5. In order to avoid additional errors in the one-time determination of the distance value, the processing unit part 25a has, in addition, a mean value unit 33 which averages over a defined number of distance values (a), that is, in each case, a complete rotation of a scanning circle 36. This is done in order to obtain mean values $a_{mit}$ in the form of averaged distance values of the probe 4 to the surface of the workpiece 5. The averaging unit 33 is so configured that it determines this distance value $a_{mit}$ at a time point at which all scanning points (a) are still located on the surface of the workpiece 5 to be measured. The particular distance value $a_{mit}$ is likewise transmitted via the interface 26 to the processing unit part 25b and is here intermediately stored in the computer unit 49 until the computation of the exact point P of the edge 13.

As already explained above, it is necessary with respect to measuring edges in accordance with the invention that the scanning ray 18 of the probe 4 incidents substantially perpendicularly to the surface of the workpiece 5 to be measured and, in this way, the distances (a) of a rotation of a scanning circle 36 are substantially constant as long as the scanning circle 36 is located on the surface of the workpiece 5 to be measured. For this purpose, the probe 4 is usually set up before the actual measurement of the point P of the edge 13 in that, for example, several distance values (a) are arbitrarily recorded and the probe 4 is aligned via the rotation-pivot unit 14 relative to the surface of the workpiece 5 to be measured so that the distance values (a) are approximately equal for one rotation of a scanning circle 36. However, it can be that the surface has nonuniformities or is arcuate so that a proper measurement of the point P of the edge 13 is not possible. For this reason, an analyzer 35 can be provided in the processing unit part 25a which is directly connected to the memory 48 and parts of the stored distance values (a) can be subjected to a Fourier analysis in order to hereby obtain information as to the reliability of the edge measurement.

As distance values (a), only those values are analyzed by the analyzer 35 which were recorded while the scanning circle 36 still was completely on the surface of the workpiece 5 to be measured.

Figure 8:
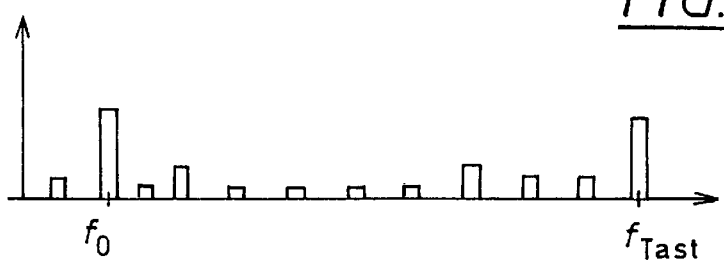
FIG. 8 is a Fourier profile of the distance measurement values of the probe of the apparatus shown in FIGS. 1 and 2 for passing over the edge; and, FIGS. 9 and 10 show fitting of mean values into a stored reference value series to determine the type of the edge measured.

In FIG. 8, a Fourier profile computed by the analyzer 35 is schematically shown and presented as an example. With this Fourier profile, the above-mentioned nonuniformities are easily detected. Accordingly, the Fourier coefficient identified by $f_0$ represents, for example, the rotational frequency of the scanning point. With the magnitude of the coefficient $f_0$, a precise determination can be made as to whether and how greatly the probe 4 is inclined with respect to the surface of the workpiece 5. On the other hand, the coefficient $f_{Tast}$ is the frequency with which the distance values (a) are recorded. All coefficients, which lie between $f_0$ and $f_{Tast}$, with the exception of harmonic oscillations of $f_0$, provide a statement as to the quality of the measured surface. The greater these coefficients are, the more the surface of the workpiece is structured. The coefficients below $f_0$ permit a conclusion to be drawn as to large-area defects such as bulging surface portions.

It can happen that, in addition to the usual edges at right angles, also other edges are to be measured. For example, the following edges can be considered: edges having different radii, edges having chamfers, stepped edges, et cetera. In such cases, it is therefore desirable to determine the type of edge 13 in order to, for example, make corrections at the determined point P of the edge 13. For this purpose, an edge typifying unit 34 can be provided in the processing unit part 25a. This unit 34 determines the particular form of the edge 13 for correction of the point P of the edge 13. The edge typifying unit 34 can be connected to the mean value (averaging) unit 33. The averaging unit 33 continuously transmits formed averaged values $a_{mit}$ as to each scanning circle rotation to the edge typifying unit 34. The edge typifying unit 34 can determine the type of edge 13 in two different ways.

Figure 9:
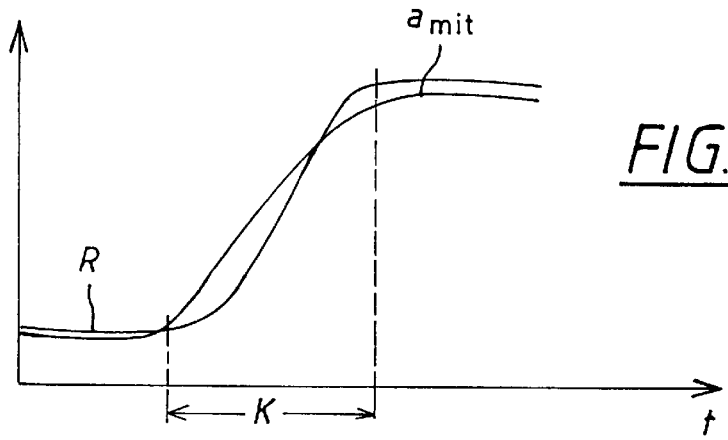

A first possibility comprises that the course of the mean values $a_{mit}$ is compared to the already available reference value series R in the edge typifying unit 34. The characteristic of the edge 13 is qualitatively determined in the edge typifying unit 34 based on the similarity of the trace of the mean values $a_{mit}$ to one of the reference value series R. For this purpose, the mean values $a_{mit}$ are simply fitted into a plurality of already-stored reference value series R as shown in connection with FIG. 9. Here, and in a first step, the reference value series R and the mean values $a_{mit}$ are mutually superposed in the direction of the abscissa (t) in such a manner that the sum of the distances of the mean values $a_{mit}$ and the points of the reference value series R becomes minimal. In a further step, the curve of the mean value (m) is extended in the direction of the ordinate until here likewise minimum distances result between the mean values $a_{mit}$ and the points of the reference value series R. The sum of the distances in the area of the edge region K is then evaluated as a measure for the coincidence with the corresponding reference value series R.

At this point, it should be noted that the mean values $a_{mit}$ and the reference value series R must be matched before fitting the curves to each other so that the time-dependent distance between two points of the reference value series R corresponds precisely to the time-dependent distance between two points of the mean values $a_{mit}$.

In a second embodiment, the edge typifying unit 34 can be configured so that a Fourier profile is computed from a defined number of mean values $a_{mit}$ and so that the computed Fourier profile is compared to a plurality of already stored reference profiles and the characteristic of the edge is determined based on the similarity of the computed profile with the reference profile.

Figure 10:
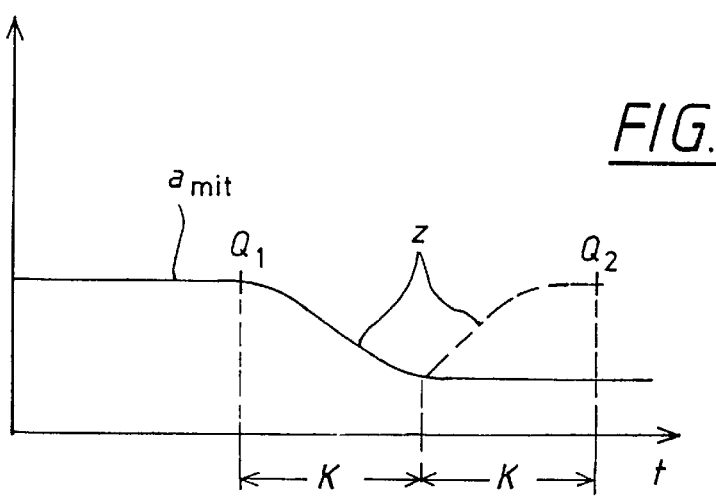

The Fourier profile is determined following the procedure which is explained in the following together with FIG. 10. In a first step, the edge region K is determined from the course of the mean values $a_{mit}$ via the slope thereof. In a further step, the mean values $a_{mit}$ are reflected in the area of the edge region K on the curve drawn as a broken line so that an axially-symmetrical curve Z results therefrom. From this curve Z, a Fourier profile can then be computed because the start point Q1 of the curve Z and the end point Q2 of the curve Z are axially symmetrical. The Fourier profile can then be fitted into a plurality of reference profiles as described above in order to thereby determine the characteristic of the edge.

The two methods described above for determining the characteristic of the edge 13 can also be applied simultaneously in the edge typifying unit 34. For example, the first-described method can be used for edges having a radius of less than the scanning circle diameter 36; whereas, the second method can be used for edges having a diameter greater than the scanning circle 36a.

It should also be noted that the method described herein is in no way limited to the embodiments shown and described. Various other embodiments are also covered by the invention. Thus, a portal measuring apparatus can be used in lieu of the stand measuring apparatus. Also, the precise arrangement of the electronic components such as the processing unit (25a, 25b) can be varied and configured differently.

It is understood that the foregoing description is that of the preferred embodiments of the invention and that various changes and modifications may be made thereto without departing from the spirit and scope of the invention as defined in the appended claims.

What is claimed is:

1. A method for measuring the edge of a workpiece utilizing an optical probe of a coordinate measuring apparatus to measure distances (a) between the optical probe and the surface of the workpiece at an adjustable scanning point thereon, the method comprising the steps of:
    moving said scanning point along a path and over said edge in such a manner that the scanning point intersects said edge at a plurality of mutually adjacent locations;
    measuring said distances (a) with said probe during the movement of said scanning point along said path and recording the measured distance values (a); and,
    determining the intersect points between said path and said edge from said distance values (a) and determining a point (P) of said edge therefrom via interpolation.

2. The method of claim 1, comprising the further step of deriving at least one time signal ($t_{180}$) from said distance values (a) which fixes at which time point positions (X, Y, Z, $\alpha$, $\beta$) of said apparatus are to be assumed for determining said point (P) of said edge.

3. The method of claim 1, wherein exactly one time signal is derived from said distance values (a) which fixes at which time point positions (X, Y, Z, $\alpha$, $\beta$) of said apparatus are to be assumed for determining said point (P) of said edge; and, said time signal being derived to fix a time point at which said probe assumes a fixedly-defined position with respect to said edge.

4. The method of claim 3, wherein said time signal is determined in said probe.

5. The method of claim 4, wherein said coordinate measuring apparatus is driven at a fixed clock pulse (T); and, said time signal including a clock pulse spacing signal component ($t_{ab}$) and a trigger signal component ($t_{tr}$); said clock pulse spacing signal component ($t_{ab}$) indicating the number of pulses ago said probe assumed said fixedly-defined position and said trigger signal component ($t_{tr}$) fixing a time point at which said fixedly-defined position lies back in time by said number of pulses.

6. The method of claim 5, wherein, to determine said time signal, a plurality of time-dependent angles ($\tau$) are determined from the measured distance values (a).

7. The method of claim 6, wherein said time signal is determined from a trace of a function (F) approximated to said angles ($\tau$).

8. The method of claim 1, wherein said path has an arcuate form.

9. The method of claim 8, wherein said path includes a circle or a cycloid.

10. The method of claim 1, wherein mean values ($a_{mit}$) are formed over a defined number of said distance values (a).

11. The method of claim 10, comprising the further steps of:
    comparing a trace of said mean values ($a_{mit}$) to a plurality of already previously stored reference value series (R); and,
    determining the character of said edge based on the similarity of said trace of said mean values to one of said reference value series.

12. The method of claim 10, comprising the further steps of:
    computing a Fourier profile from a defined number of said mean values ($a_{mit}$);
    comparing the computed Fourier profile to a plurality of previously stored reference profiles; and,
    qualitatively determining the character of said edge based on the similarity of said computed Fourier profile to one of said reference profiles.

13. The method of claim 1, comprising the further step of Fourier analyzing a portion of the stored distance values in order to obtain data as to the reliability of the edge measurement.

14. A coordinate measuring apparatus for measuring an edge of a workpiece having a surface, the coordinate measuring apparatus comprising:
    an optical probe for measuring distance values (a) between said probe and said surface at an adjustable scanning point;
    a control for moving said scanning point along a path and over said edge in such a manner that said edge is intersected in a plurality of mutually adjacent locations;
    a processing unit connected to said optical probe for recording the distance values (a) measured during the movement thereof; and,
    said processing unit being adapted to determine a plurality of the intersect points between said path and said edge from said distance values (a) and to then determine a point (P) of said edge therefrom via interpolation.

15. The coordinate measuring apparatus of claim 14, said processing unit including a time-determining unit for deriving at least one time signal ($t_{180}$) from said distance values (a) which fixes at which time point positions (X, Y, Z, $\alpha$, $\beta$) of said apparatus are to be assumed for determining said point (P) of said edge.

16. The coordinate measuring apparatus of claim 15, wherein said time-determining unit derives exactly one time signal which fixes a time point at which said optical probe assumes a fixedly-defined position relative to said edge.

17. The coordinate measuring apparatus of claim 15, wherein a first part of said processing unit is disposed in said optical probe.

18. The coordinate measuring apparatus of claim 15, wherein said processing unit includes a clock for driving said apparatus at a fixed clock pulse (T); and, said time signal ($t_{180}$) including a clock pulse spacing signal component ($t_{ab}$) and a trigger signal component ($t_{tr}$); and, said clock pulse spacing signal component ($t_{ab}$) indicating the number of pulses ago said probe assumed said fixedly-defined position and said trigger signal component ($t_{tr}$) fixing a time point at which said fixedly-defined position lies back in time by said number of pulses.

19. The coordinate measuring apparatus of claim 15, wherein said processing unit, for determining said time signal, further includes an angle calculation unit for determining a plurality of time-dependent angles ($\tau$) from the measured distance values (a).

20. The coordinate measuring apparatus of claim 19, wherein said time signal is determined in said time-determining unit from a trace of a function (F) approximated to said time-dependent angles ($\tau$).

21. The coordinate measuring apparatus of claim 14, wherein said optical probe is a ring probe.

22. The coordinate measuring apparatus of claim 14, further comprising a rotation-pivot unit connected to said optical probe for permitting rotational and pivotal movement of said optical probe relative to said workpiece.

23. The coordinate measuring apparatus of claim 14, wherein said processing unit includes an averaging unit for determining a mean value ($a_{mit}$) over a defined number of said distance values (a).

24. The coordinate measuring apparatus of claim 23, wherein said processing unit includes an edge typifying unit for comparing a trace of said mean values ($a_{mit}$) to a plurality of already previously stored reference value series (R); and, determining the character of said edge based on the similarity of said trace of said mean values to one of said reference value series.

25. The coordinate measuring apparatus of claim 23, wherein said processing unit includes an edge typifying unit for computing a Fourier profile from a defined number of said mean values ($a_{mit}$);

comparing the computed Fourier profile to a plurality of previously stored reference profiles; and, qualitatively determining the character of said edge based on the similarity of said computed Fourier profile to one of said reference profiles.

26. The coordinate measuring apparatus of claim 14, wherein said processing unit includes an analyzer for Fourier analyzing a portion of the stored distance values in order to obtain data as to the reliability of the edge measurement.

27. A method for measuring the edge of a workpiece utilizing an optical probe of a coordinate measuring apparatus to measure distances (a) between the optical probe and the surface of the workpiece at an adjustable scanning point thereon, the method comprising the steps of:

moving said scanning point along a loop path and over said edge;

measuring said distances (a) with said optical probe during the movement of said scanning point along said path and recording the measured distances (a); and, determining a point (P) of said edge from a trace of said distances (a).

28. A coordinate measuring apparatus for measuring an edge of a workpiece having a surface, the coordinate measuring apparatus comprising:

an optical probe for measuring distance values (a) between said probe and said surface at an adjustable scanning point;

a control for moving said scanning point along a loop path and over said edge;

a processing unit connected to said optical probe for recording the distance values (a) measured during the movement thereof; and said processing unit being adapted to determine a point (P) from a trace of said distance values (a).

29. A method for measuring the edge of a workpiece utilizing an optical probe of a coordinate measuring apparatus to measure distances (a) between the optical probe and the surface of the workpiece at an adjustable scanning point thereon, the method comprising the steps of:

moving said scanning point along a path and over said edge in such a manner that the scanning point intersects said edge at at least three mutually adjacent locations;

measuring said distances (a) with said probe during the movement of said scanning point along said path and recording the measured distance values (a); and, determining the intersect points between said path and said edge from said distance values (a) and determining a point (P) of said edge therefrom via interpolation.

30. A coordinate measuring apparatus for measuring an edge of a workpiece having a surface, the coordinate measuring apparatus comprising:

an optical probe for measuring distance values (a) between said probe and said surface at an adjustable scanning point;

a control for moving said scanning point along a path and over said edge in such a manner that said edge is intersected in at least three mutually adjacent locations;

a processing unit connected to said optical probe for recording the distance values (a) measured during the movement thereof; and, said processing unit being adapted to determine a plurality of the intersect points between said path and said edge from said distance values (a) and to then determine a point (P) of said edge therefrom via interpolation.

* * * * *